(12) United States Patent
Tyrrell et al.

(10) Patent No.: US 7,474,291 B2
(45) Date of Patent: Jan. 6, 2009

(54) RELATIVE BRIGHTNESS ADJUSTMENT FOR LCD DRIVER ICS

(75) Inventors: Julian Tyrrell, Cricklade (GB); Tony Coffey, Highworth (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 503 days.

(21) Appl. No.: 11/001,381

(22) Filed: Dec. 1, 2004

(65) Prior Publication Data
US 2006/0109226 A1 May 25, 2006

(30) Foreign Application Priority Data
Nov. 23, 2004 (EP) .................................. 04392048

(51) Int. Cl.
*G09G 3/36* (2006.01)
(52) U.S. Cl. ............................. 345/89; 345/87; 345/100
(58) Field of Classification Search ........... 345/1.1–1.3, 345/87–100, 204
See application file for complete search history.

(56) References Cited

U.S. PATENT DOCUMENTS

| | | | |
|---|---|---|---|
| 5,699,076 A * | 12/1997 | Tomiyasu .................... 345/103 |
| 5,739,803 A | 4/1998 | Neugebauer .................. 345/98 |
| 6,118,413 A | 9/2000 | Bril et al. ........................ 345/3 |
| 6,181,300 B1 | 1/2001 | Poon et al. ...................... 345/1 |
| 6,362,803 B1 | 3/2002 | Tomomura et al. ............ 345/94 |
| 7,084,866 B2 * | 8/2006 | Kobayashi .................. 345/214 |
| 7,176,947 B2 * | 2/2007 | Kudo et al. .................. 345/690 |
| 2003/0020677 A1 * | 1/2003 | Nakano ....................... 345/87 |

FOREIGN PATENT DOCUMENTS

JP   2002196308   7/2002

* cited by examiner

Primary Examiner—Richard Hjerpe
Assistant Examiner—Kimnhung Nguyen
(74) Attorney, Agent, or Firm—Saile Ackerman LLC; Stephen B. Ackerman

(57) ABSTRACT

Circuits and methods to adjust the brightness of LCD displays have been achieved. The invention applies for LCD systems having a single or multiple display screens. The technique applied makes use of the property of LCDs where each pixel responds to the applied RMS voltage across it, and changing the timing of the COMMON signal reduces the applied voltage. This technique is applicable to both black and white and color displays as well as both standard scan and multi-addressing schemes.

26 Claims, 5 Drawing Sheets

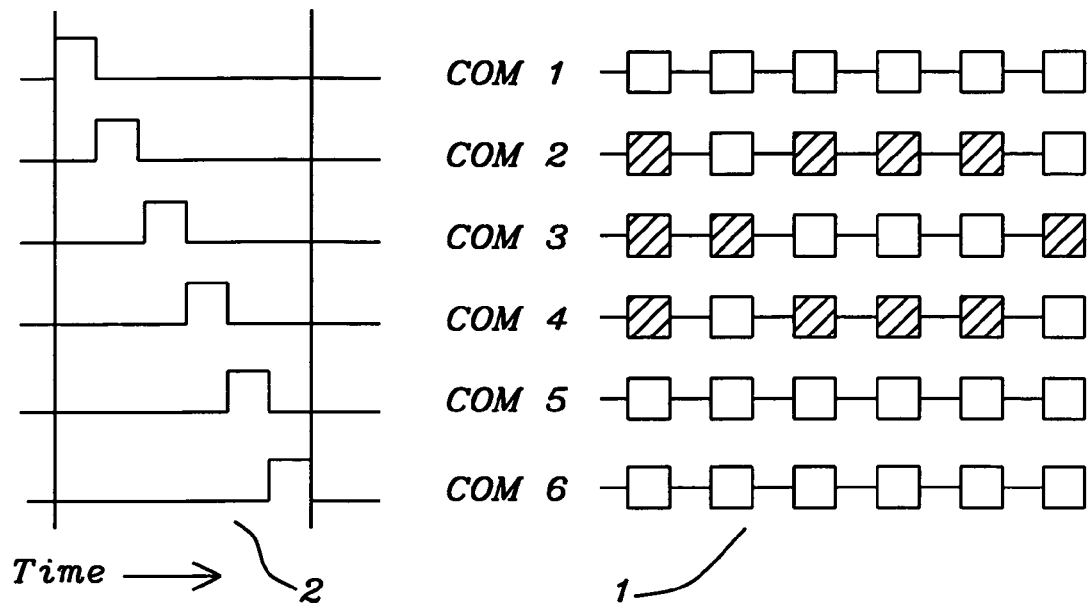
FIG. 1 – Prior Art
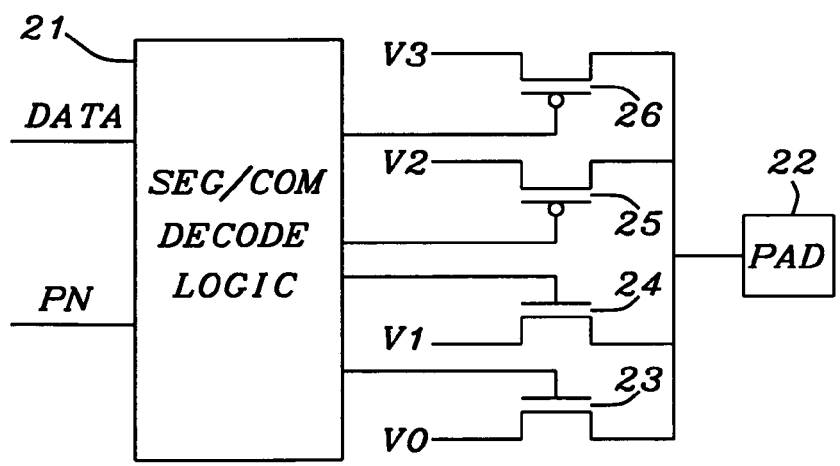
FIG. 2 – Prior Art

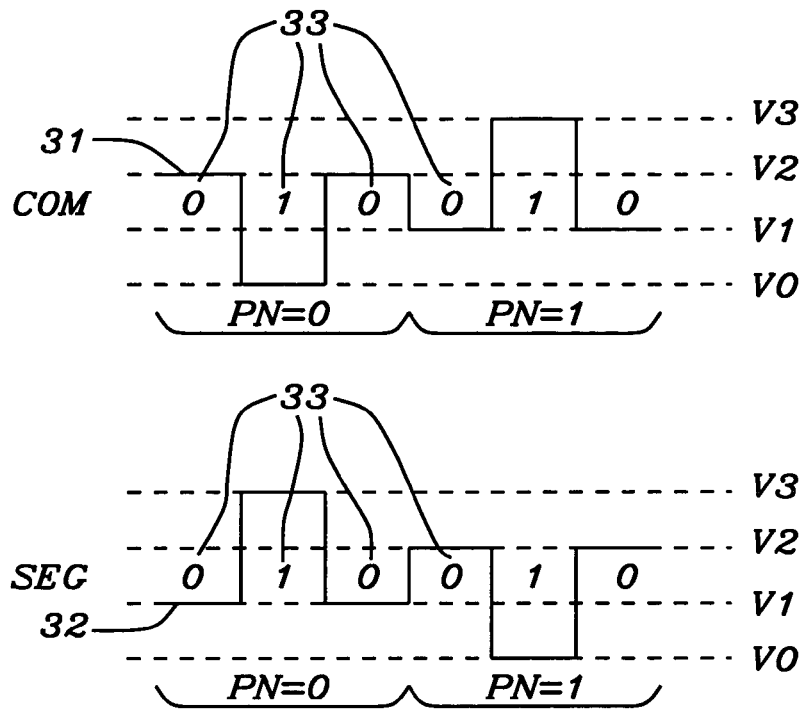
FIG. 3 - Prior Art
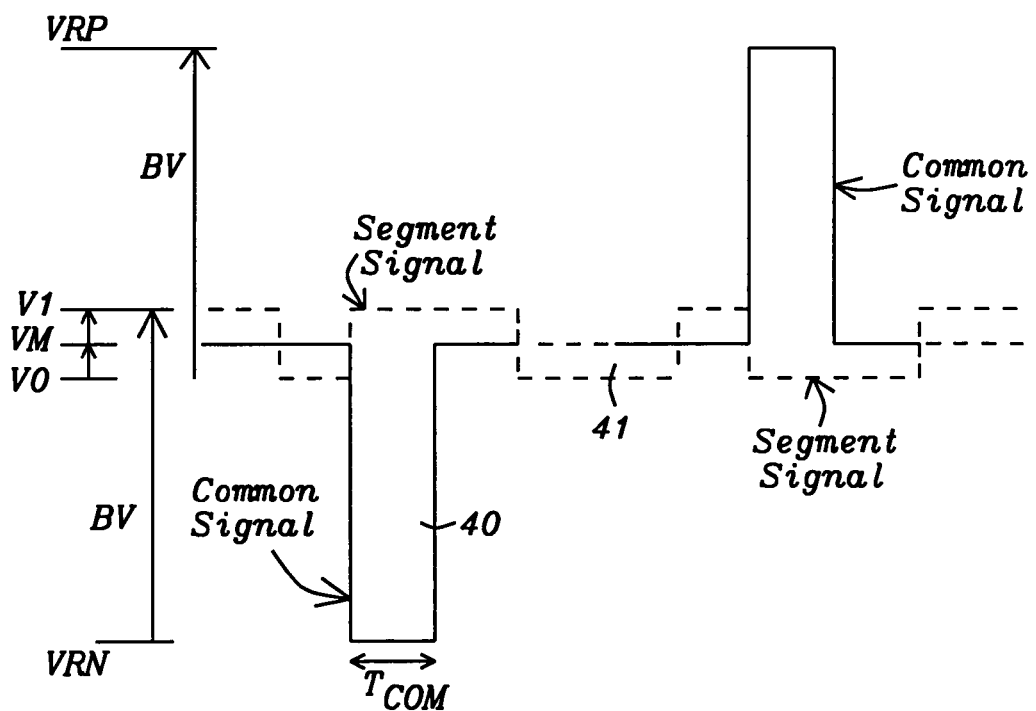
FIG. 4 - Prior Art

RELATIVE BRIGHTNESS ADJUSTMENT FOR LCD DRIVER ICS

(1) FIELD OF THE INVENTION

This invention relates generally to Liquid Crystal Displays (LCD), and more particularly to a method and a system to adjust the brightness of pixels of STN LCDs.

(2) DESCRIPTION OF THE PRIOR ART

Liquid crystal displays (LCD) use nematic liquid crystals. The molecular order in a nematic liquid crystal, which results from weak intermolecular forces, is easily disrupted. For this reason, liquid crystals flow like an ordinary liquid. Because of the weakness of the intermolecular forces, the molecules in a nematic phase are easily realigned along new directions.

A liquid crystal display uses this ease of molecular reorientation to change areas of the display from light to dark, resulting in patterns that you see in the display. The display consists of liquid crystals contained between glass plates whose interior surfaces are treated to align the molecules in a given direction. When the voltage to a set of electrodes in some area of the display is turned on, the molecules of the liquid crystal in that area reorient along a new direction. When this voltage is turned off, the molecules return to their original orientation.

LCD's require an AC drive voltage with virtually no DC component. Prolonged DC operation may cause electrochemical reactions inside the display, which will cause significantly reduced lifetime. It is essential that the voltage wave-form across the glass plates of the display be maintained at an average DC value of zero because the glass is likely to suffer a break-down if a non-zero DC voltage is applied for any sustained period of time. There is threshold behavior for most LCD's and no change in transmission occurs until a threshold voltage, Vth, is reached. Transmission then decreases as the voltage increases until saturation is reached. Threshold voltage is typical 1.5-2.5 volts, and saturation occurs at about 4-5 volts.

The pixels across each horizontal "common" row of a LCD are connected together on the plate on one side of the liquid crystal film, and all the pixels in each vertical "segment" column are connected on the opposite side. The "commons" are then addressed serially by setting all the column voltages separately for each "common" and then turning on the "common" voltages in sequence.

Principally LCD's require a differential voltage greater than the threshold voltage Vth of the nematic fluid between two conducting layers to generate an "ON" pixel. The display consists of a matrix of pixels created by vertical "segment" (SEG) and horizontal "common" (COM) conductive layer either side of the nematic fluid. The display has the electrical characteristics of a capacitor, so requiring a "charging" current every time a "segment" and/or "common" are switched.

In order to display a whole picture the "commons" are scanned in sequence and the segments switched appropriately. This is done so that the applied root-mean-square (RMS) voltage between each common and segment is controlled to be greater ("ON") or less than ("OFF") the threshold voltage Vth of the display.

The data for the display is contained in a random access memory (RAM), which is typically structured to be the same as the display. For example, a display of 80 segments and 64 commons would have a RAM of 80 by 64 bits. The display scan reads a row of the RAM for each active common output.

FIG. 1 prior art shows a simple display comprising 6 segments and 6 commons. The waveforms 2 show the sequencing of the commons over time during a display scan. The matrix 1 on the right shows the 36 pixels. The black rectangles represent "ON" pixels, the white rectangles represent "OFF" pixels. All the 6 commons are selected, independent if all pixels in a row are "OFF" or not. In the example of FIG. 1 prior art e.g. the rows 1, 5 and 6 are blank, this means all pixels are "OFF".

FIG. 2 prior art shows a simplified basic circuit of a typical COM/SEG decode logic-generating signals to a pad control circuitry 22. Pad refers to the input to the LCD glass. The input to said SEG/COM decode logic 21 is data read out from a RAM and the PN signal. PN (Positive/Negative) refers to a signal to change the polarity between the Common and the Segment pad and is switching regularly between "0" and "1" to ensure that an average DC value of zero is achieved. The output of said SEG/COM decode logic 21 activates one of the four symmetric voltages V0-V3. Four transistors 23, 24, 25, and 26 perform the switching. The signal generated is linked to the related pad providing input to the LCD glass. There are other known methods to drive an LCD using five or six symmetric voltages.

The following table shows related decode logic of said driver 21. The table shows which one of the four output voltages V0 to V3 is applied depending on the input values of data and PN:

| DATA | PN | SEG | COM |
|------|----|----|-----|
| 0 | 0 | V1 | V2 |
| 1 | 0 | V3 | V0 |
| 0 | 1 | V2 | V1 |
| 1 | 1 | V0 | V3 |

For example, if the data is "1" either SEG or COM is at the maximum voltage V3, dependent on the value of the polarity signal PN and the related pixel is "lit".

As another example of a typical implementation FIG. 3 prior art shows the COM and SEG voltage waveforms for a simple Super Twisted Nematic (STN) LCD display; where the outputs switch one of four symmetric voltages as it has been shown by FIG. 2 prior art.

The curve 31 shows the waveform of the COMMON voltage, the curve 32 shows the waveform of the SEGMENT voltage. The related pixels 33 are lit ("1") if either the COM signal or the SEG signal is at the maximum value V3.

FIG. 4 prior art shows a symmetrical drive technique using five symmetrical voltages. The two phase drive is shown where the signal polarity inverts. The waveforms of the COMMOM signal 40 and of the SEGMENT signal 41 are shown. The difference between VM and V1 or V2 is 1 Volt. The relationship of the voltages is that the segment switches 2 Volts and the common switches (B-1) Volts. B is commonly referred to as the bias ratio. The symmetrical drive technique is one example of different drive techniques known, as e.g. the classic Alt & Peshko drive technique using six voltages with the segment and common drive outputs switching between these six voltages. The voltages VRP and VRN represent the positive and the negative amplitudes of the COMMON signal. The voltages V1 and V0 represent the positive and the negative amplitudes of the SEGMENT signal. The switching period of the COMMON signal is $T_{COM}$.

There are patents known describing the adjustment of brightness of LCD panels and the control of multiple display devices.

U.S. Pat. No. 6,181,300 (to Poon et al.) teaches a display data format conversion circuit and method facilitating display of data on a plurality of display devices based on display data of a source display device. The system incorporates a resynchronization circuit that dynamically varies a frame rate of one display device based on the instantaneous frame rate of the source device to maintain synchronization of the displays. A display timing generator circuit for a first display, such as an LCD display, produces a first display timing signal. The resynchronization circuit is operatively responsive to the first display timing signal and a second display timing signal wherein the second display timing signal is associated with a second display device, such as a source display device. In one embodiment, the resynchronization circuit includes a vertical blanking time variation circuit that adaptively and continuously varies the frame rate of the first display device by varying a vertical blanking time of the first display device.

U.S. Pat. No. 6,118,413 (to Bril et al.) discloses a video controller for controlling at least two video displays having independent refresh rates and pixel resolutions. In a first embodiment, two separate data paths are provided within a video controller for each video display (e.g., CRT and LCD). Taking advantage of the increased bandwidth of 64 bit wide DRAMS, data for each data path may be retrieved in separate read cycles. Each datapath may operate at its own clock frequency characteristic of refresh rate and pixel resolution. The dual data path embodiment also reduces the complexity of the software model needed to drive such dual displays. IN an alternative embodiment, a single data path may be provided within a video controller to drive data for two video displays having independent refresh rates and pixel resolutions. A data "tag" (extra bit) is attached to each word or dword passing through the data path indicating the destination (e.g., CRT or LCD) of the video data. At the output of the data path, separate FIFOs (e.g., LCD and CRT) are provided to temporarily store video data. FIFO pointers are fed back to a sequence controller to drive data read cycles from display memory. The use of tags and FIFO pointer feedback allows two video displays to be driven at different data rates, allowing for independent resolution and refresh rates in each display.

U.S. Pat. No. 5,739,803 (to Neugebauer) discloses a novel electronic apparatus for driving passive x-y addressed liquid crystal displays (LCDs) and having improved display performance. This apparatus is comprised of row driving integrated circuits capable of driving row lines of the LCD with a pattern of voltages corresponding to the basis vectors of a linear transform matrix. Column driver circuits containing analog CMOS pixel memory store video information and compute the linear transform of the pixel matrix. High voltage amplifier circuits to drive the column lines with voltages corresponding to the linear transform of the pixel matrix columns can be monolithically integrated with the transform computation circuitry. The LCD screen inherently performs the inverse transform and displays the desired pixel matrix. The speed and contrast of the LCD are improved, allowing the display of video rate images on passive LCD screens.

SUMMARY OF THE INVENTION

A principal object of the present invention is to achieve a method to adjust the relative brightness of multiple LCD display panels belonging to a LCD system.

Another principal object of the present invention is to achieve a method to adjust the brightness of a single LCD display panel.

Another further principal object of the present invention is to achieve a LCD system having multiple LCD displays being capable to adjust the relative brightness of each of the multiple displays with respect to each other.

Another further principal object of the present invention is to achieve a system to adjust the brightness of a single LCD display panel.

In accordance with the objects of this invention a method to adjust the relative brightness of LCD display panels of an LCD system having multiple LCD display panels has been achieved. The steps of the method invented are first, to provide an LCD driver IC comprising at least one RAM, multiple LCD display panels, a number of SEGMENT lines, and a number of COMMON lines. The following steps are to share said SEGMENT lines between all said LCD display panels, to use separate COMMON lines for each of said LCD panels, and to adjust the relative brightness of each of said LCD display panels by modifying the width of the COMMON pulses of each of said LCD panels.

In accordance with the objects of this invention a method to adjust the brightness of pixels of an LCD system having one LCD display panel has been achieved. The first step of the method invented is to provide an LCD driver IC comprising a RAM, an LCD display panel, a number of SEGMENT lines, and a number of COMMON lines. The next step is to adjust the relative brightness of said LCD display panel by modifying the width of the COMMON pulses of said LCD display panel.

In accordance with the objects of this invention an LCD system having multiple LCD display panels, wherein the relative brightness of each panel compared to any other panel can be adjusted by modifying the pulse width of its COMMON pulses, has been achieved. The system invented comprises multiple LCD display panels sharing SEGMENT lines, one or more LCD driver ICs comprising each one or more RAMs and providing identical SEGMENT signals for all said LCD display panels and individual COMMON signals for each of said LCD display panels. Furthermore the system comprises a number of said SEGMENT lines connecting said one or more LCD driver ICs with all said LCD display panels and a number of COMMON lines connecting said one or more LCD driver ICs individually with each of said LCD display panels.

In accordance with the objects of this invention an LCD system having one LCD display panel wherein the brightness of the pixels of said panel can be adjusted by modifying the pulse width of its COMMON pulses has been achieved. The system invented comprises, first, said LCD display panel, and an LCD driver IC comprising a RAM and providing SEGMENT signals and COMMON signals for said LCD display panel. Furthermore the system invented comprises a number of said SEGMENT lines connecting said LCD driver IC with said LCD display panel and a number of COMMON lines connecting said LCD driver IC with said LCD display panel.

BRIEF DESCRIPTION OF THE DRAWINGS

In the accompanying drawings forming a material part of this description, there is shown:

FIG. 1 prior art illustrates a simple 6 segment and 6 common display with a displayed picture including waveforms showing the sequencing of the commons during a display scan.

FIG. 2 prior art shows a circuit of a typical COM/SEG decode logic-generating signals to the pad control circuitry.

FIG. 3 prior art shows the COM and SEG voltage waveforms for a simple Super Twisted Nematic (STN) LCD display.

FIG. 4 prior art shows a symmetrical drive technique for an LCD display.

DESCRIPTION OF THE PREFERRED EMBODIMENTS

The preferred embodiments of the present invention disclose novel methods and systems for brightness adjustment for LCDs having a single display or multiple displays.

It has to be understood that the brightness adjustment invented is applicable to all kind of LCD displays, as e.g. STN, D-STN, HPD, CSTN, and TN, except for TFT type (i.e. displays that don't have any active circuitry on the glass).

The present invention makes use of the property of LCDs where each pixel responds to the applied root-mean-square (RMS) voltage across it and changing the timing of the common signal reduces or increases the applied voltage. This technique is applicable to both black-and-white and color displays as well as both linear scan and multi-line addressing (MLA) schemes.

Both standard and MLA addressing schemes are designed for use with root-mean-square (RMS) responding liquid crystal electro-optical effects, such as e.g. the STN effect. In RMS effects the electrical stimulus is related to the square of the applied voltage $u^2$ because the field-induced polarization (which is proportional to the electric field) interacts with the electric field itself, giving a field squared dependence. In a multiplexed display the addressing waveform appearing across a pixel is periodic over a frame period, which is subdivided into a series of equal subintervals, or time slots, where the applied voltage has constant amplitude over each time slot, but may change from slot to slot depending on the required intensity of each pixel. It is the cumulative effect of $u^2$ over each of these time slots that determines the optical state of each pixel. In order for the optical state of the pixel to be determined by the RMS value of the pixel voltage it is sufficient that the characteristic response time of the display be many times longer than the frame period; this is the case for a standard addressed STN display. For MLA addressing, near RMS response can be achieved by a much narrower averaging window, permitting faster responding STN panels to be used.

Figure 5:
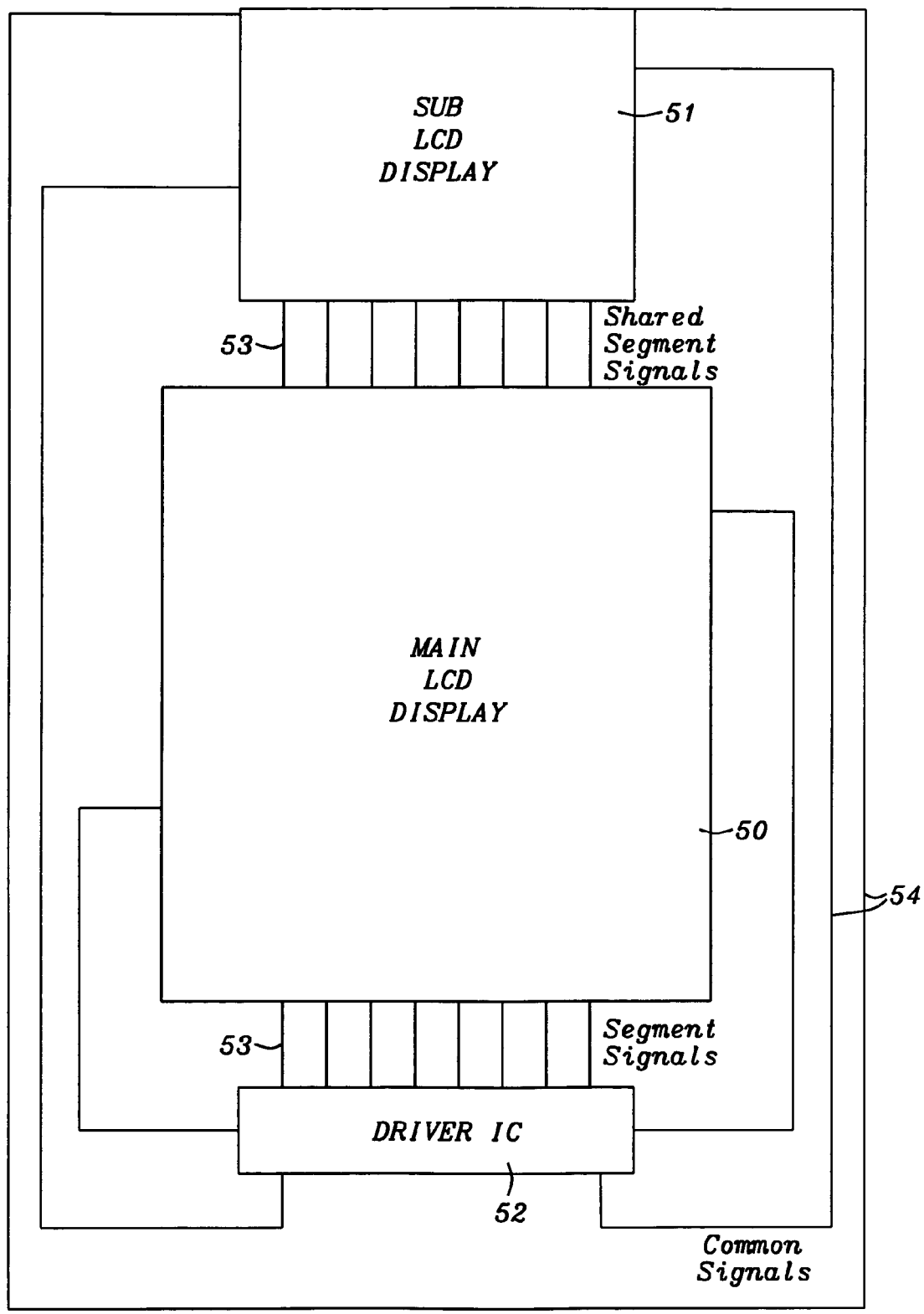
FIG. 5 illustrates a configuration of a dual LCD driven from a single display driver IC.

FIG. 5 shows the configuration of a first embodiment of the present invention. A dual LCD display, comprising a main LCD display 50 and a sub LCD display 51, an LCD driver IC 52. The segment lines 53 are shared across both main LCD panel 50 and sub LCD panel 51 having separate common drives 54 for the two LCD panels 50 and 51. This allows the two LCD display panels 50 and 51 to either be driven independently with different data or share the same data from the display RAM contained in the driver IC 52. Depending upon the implementation of the circuitry one or two RAMs could be used for the LCD system invented. For sake of clarity a few segment and common signals only are drawn.

It has to be understood that alternatively the brightness of more than two LCD displays can be controlled by the technique invented if a driver IC, or two driver ICs that share the drive voltages, drive multiple displays. The technique adjusts the applied RMS voltage by a time based technique so allowing common drive voltages to be used for all displays. Furthermore the technique invented is applicable for front and backside LCD displays of one physical unit as well as for two and more physical units.

The adjustment the relative brightness of one panel with respect to the other panel for a dual LCD driver requires the applied RMS voltage to be different for the two panels. The method described here is to shorten the width of the COM pulse inside the common period (shown as $T_{COM}$ in the diagrams).

Figure 6:
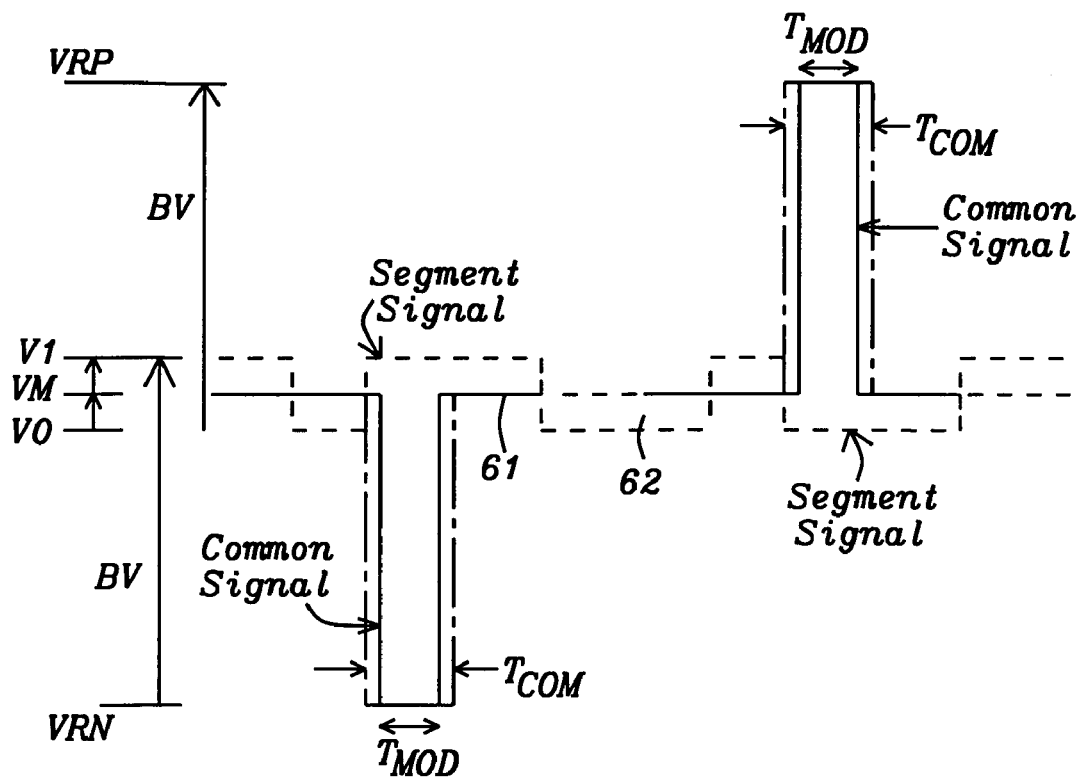
FIG. 6 illustrates an example of the SEGMENT and COMMON voltages for a symmetrical scan with the reduced switching period for the common signal of the present invention.

FIG. 6 shows an example of the brightness adjustment of the present invention. FIG. 6 shows the waveforms of the SEGMENT voltage 62 and the COMMON voltage 63 for a symmetrical scan with a reduced switching period $T_{MOD}$ for the COMMON signal. The difference between $T_{MOD}$ and $T_{COM}$ defines the degree of the adjustment of brightness of a pixel. This modification of the pulse width of the COM signal can be used for all other drive techniques as e.g. for the classic Alt & Peshko drive technique as well.

Figure 7:
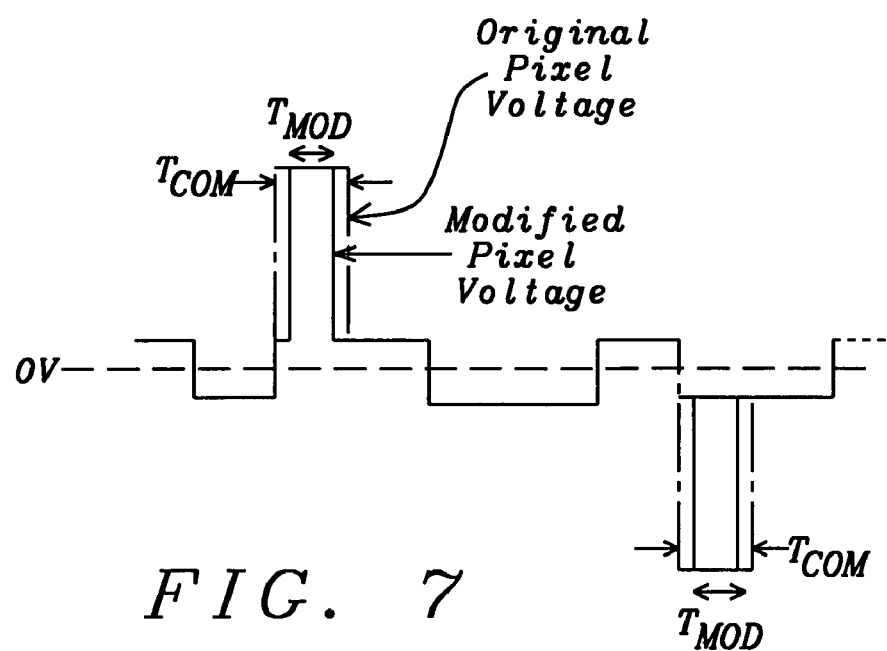
FIG. 7 shows resulting applied pixel voltage according to the SEGMENT and COMMON voltages shown in FIG. 6.

FIG. 7 shows the applied pixel voltage of the present invention for a symmetrical LCD drive technique. The RMS voltage of this waveform, which is the addition of the COMMON signal and the SEGMENT signal shown in FIG. 6, is proportional to the optical state of the pixel that is it determines the level of brightness of the pixel.

The adjustment of the relative brightness of one panel with respect to the other panel for the dual LCD driver shown in FIG. 6 requires the applied RMS voltage to be different for the two panels. The method of the present invention illustrated in FIG. 7 is to shorten the width of the COM pulse inside the common period (shown as $T_{COM}$ in the diagrams). The RMS voltage of the waveform of the modified pixel voltage is lower than the value resulting from the waveform of the original pixel voltage. The shortened pulse width of the common pulse is $T_{MOD}$. FIG. 7 shows an example of the segment and common voltages for the symmetrical scan with the reduced switching period for the common signal, $T_{MOD}$ (where $T_{MOD}$ is less than $T_{COM}$). Both increasing and decreasing the COMMON pulse width is accommodated in the design of the driver. In present applications the pulse width is usually decreased only.

Furthermore it has to be understood that the method invented can be not only used to modify the relative brightness of multiple LCDs but also to control brightness of the optical effect of a pixel for a single display as well.

Figure 8:
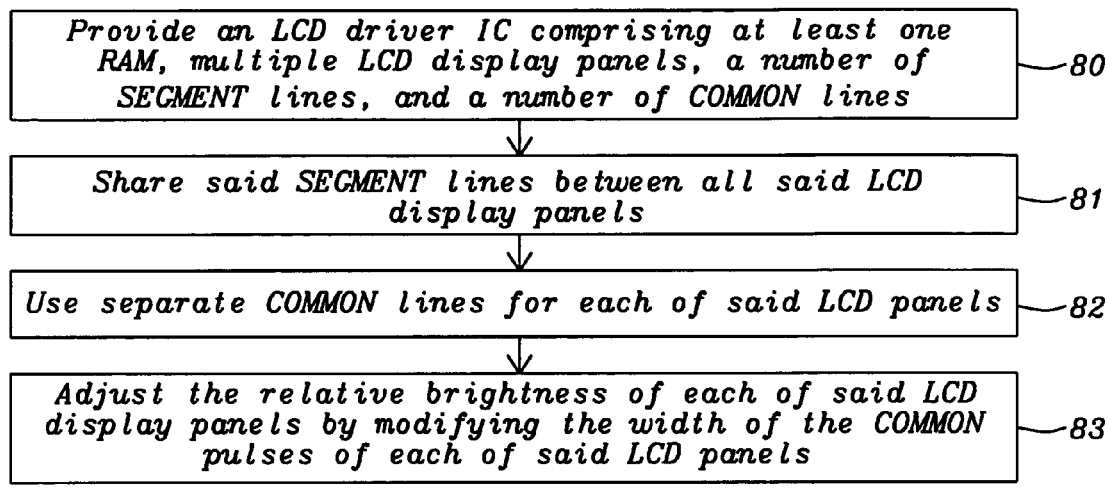
FIG. 8 shows a flowchart of the method invented to adjust the relative brightness of LCD display panels of an LCD system having multiple LCD display panels.

FIG. 8 illustrates a method invented to adjust the relative brightness of an LCD system having multiple displays. Step 80 describes the provision of an LCD driver IC comprising at least one RAM, multiple LCD display panels, a number of SEGMENT lines, and a number of COMMON lines. Step 81 comprises to share said SEGMENT lines between all said LCD display panels. Step 82 comprises to use separate COMMON lines for each of said LCD panels and in the last step 83 the relative brightness of each of said LCD display panels is adjusted by modifying the width of the COMMON pulses of each of said LCD display panels.

It has to be understood that the same method as described above can be applied if different data or the same data are displayed on both displays.

Figure 9:
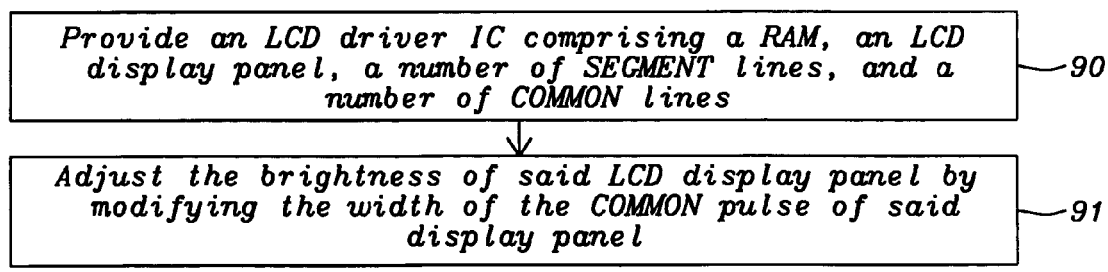
FIG. 9 shows a flowchart of the method invented to adjust to adjust the brightness of pixels of an LCD system having one LCD display panel.

FIG. 9 shows a flowchart of a similar method, which can be applied to modify the brightness of pixels of a LCD system having a single display. Step 80 describes the provision of an LCD driver IC comprising a RAM, an LCD display panel, SEGMENT lines, and COMMON lines. Step 81 illustrates the adjustment of the relative brightness of a said LCD panel by modifying the width of the COMMON pulse of said LCD display panel.

While the invention has been particularly shown and described with reference to the preferred embodiments thereof, it will be understood by those skilled in the art that various changes in form and details may be made without departing from the spirit and scope of the invention.

What is claimed is:

1. A method to adjust the relative brightness of multiple separate LCD display screens of an LCD system having said separate multiple LCD display screens is comprising:
    provide an LCD driver IC comprising at least one RAM, multiple separate LCD display screens, a number of SEGMENT lines, and a number of COMMON lines;
    share said SEGMENT lines between all said separate LCD display screens;
    use separate COMMON lines for each of said separate LCD display screens; and
    adjust the relative brightness of each of said separate LCD display screens by modifying the width of the COMMON pulses of each of said separate LCD display screens.

2. The method of claim 1 wherein two separate LCD display screens are used.

3. The method of claim 2 wherein said two LCD display screens are on the front and backside of one physical unit.

4. The method of claim 1 wherein the relative brightness of an LCD display screen is lowered by reducing the pulse width of the correspondent COMMON signals.

5. The method of claim 1 wherein the relative brightness of an LCD display screen is increased by increasing the pulse width of the correspondent COMMON signals.

6. The method of claim 1 wherein said LCD system is an STN LCD system.

7. The method of claim 1 wherein said LCD system is a D-STN system.

8. The method of claim 1 wherein said LCD system is a CSTN LCD system.

9. The method of claim 1 wherein said LCD system is a TN LCD system.

10. The method of claim 1 wherein said LCD system is an HPD LCD system.

11. The method of claim 1 wherein said LCD system has two RAMs.

12. The method of claim 1 wherein said LCD system is using a standard linear scan scheme.

13. The method of claim 1 wherein said LCD system is using a multi-line-addressing (MLA) scheme.

14. The method of claim 1 wherein said LCD system is using black and white displays.

15. The method of claim 1 wherein said LCD system is using color displays.

16. An LCD system having multiple, separate LCD display screens wherein the relative brightness of each of said separate LCD display screen compared to any other LCD display screen can be adjusted by modifying the pulse width of its COMMON pulses is comprising:
    multiple, separate LCD display screens sharing SEGMENT lines;
    one or more LCD driver ICs comprising each one or more RAMs and providing identical SEGMENT signals for all said separate LCD display screens and individual COMMON signals for each of said separate LCD display screens;
    a number of said SEGMENT lines connecting said one or more LCD driver ICs with all said LCD display screens; and
    a number of COMMON lines connecting said one or more LCD driver ICs individually with each of said LCD display screens.

17. The system of claim 16 wherein two separate LCD display screens are used.

18. The system of claim 17 wherein said two LCD display screens are on the front and backside of one physical unit.

19. The system of claim 16 wherein the relative brightness of an LCD display screen is lowered by reducing the pulse width of the correspondent COMMON signals.

20. The system of claim 16 wherein the relative brightness of an LCD display screen is increased by increasing the pulse width of the correspondent COMMON signals.

21. The system of claim 16 wherein said LCD system is an STN LCD system.

22. The system of claim 16 wherein said LCD system is a D-STN system.

23. The system of claim 16 wherein said LCD system is a CSTN LCD system.

24. The system of claim 16 wherein said LCD system is a TN LCD system.

25. The system of claim 16 wherein said LCD system is an HPD LCD system.

26. The system of claim 16 wherein said LCD system has two RAMs.

* * * * *